United States Patent Office 3,133,799
Patented May 19, 1964

3,133,799
CHARCOAL-CONTAINING POROUS FUEL
COMPOSITION
Leo A. Spano, 27 Roberts St., Cumberland Hill, R.I.
No Drawing. Filed June 15, 1960, Ser. No. 36,454
11 Claims. (Cl. 44—17)
(Granted under Title 35, U.S. Code (1952), sec. 266)

The invention described herein, if patented, may be manufactured and used by or for the Government for governmenetal purposes, without the payment to me of any royalty thereon.

This invention relates to a charcoal-containing fuel composition, and more particularly to a balanced solid fuel composition capable of rapid delivery of heat, whose principal ingredients are charcoal, powdered metal, an oxidizer, and a blowing agent, preferably in the presence of a combustion catalyst.

Numerous solid fuel compositions have been proposed for outdoors cooking for military and civilian purposes; however, insofar as I am aware no existing fuel composition combines the desired properties of rapid delivery of intense heat with the necessary duration of heat delivery for the aforesaid purposes.

I have discovered a fuel composition and a method for producing it, characterized by a homogenous blend of charcoal powder, metal powder capable of sustaining a highly exothermic oxidation reaction, a nitrate as an oxidizer (oxygen source), and in combination with the foregoing a gas-producing blowing agent which during manufacture of the fuel decomposes into a mixture of gases whereby the composition is rendered highly porous. The composition also contains alkali acetate (e.g., sodium or potassium acetate) as a fluxing agent, and an organic binder.

I have found that the performance characteristics of the foregoing composition are materially improved by the addition of a combustion-promoting catalyst. I have found manganese oxalate, manganese acetate, copper oxalate, copper acetate, and mixtures of two or more of the foregoing to be suitable for this purpose. The catalyst is added in a proportion of about .1–2.5%.

The incorporation of an ammonium carbonate and ammonium bicarbonate blowing agent in the foregoing composition co-acts with the charcoal component and exothermically reacting metal powder to provide a carbonaceous fuel briquette having a high ratio of surface area to bulk volume and weight, represented by the general formula $$\frac{A}{VW}$$

where A is the exposed area, V is the bulk volume and W is the weight of the fuel slab. This ratio can be still further improved by transversely perforating the fuel briquettes and/or corrugating their surface in a manner well known to the art.

A further advantage of my invention is quick ignition of the fuel briquette (10 to 120 seconds) without the aid of liquid or solid materials as fire starters.

This phenomenon is caused, at least in part, by the highly porous structure of the fuel composition which in turn depends on the effects of the blowing agent incorporated into the original mix, namely, dissociation into gaseous products (ammonia, carbon dioxide and steam) during the manufacture of the fuel briquette at a temperature sufficiently high to cause dissociation of the blowing agent, but below the combustion temperature of the fuel briquette.

The shape of the fuel composition may be generally rectangular or cylindrical. The combustion reaction of the components of the mixture with atmospheric oxygen, takes place on a self-regenerating porous combustion surface as the fuel is gradually consumed; i.e., the fuel briquette will remain generally rectangular or cylindrical until consumed, rather than fall apart into inefficient pellets or flakes.

While a primary use of my fuel composition is for outdoors cooking, it is also possible to mold the composition into larger blocks, e.g., of brick size for space heating purposes.

The fuel composition in accordance with the foregoing principles of my invention has the following general composition:

| | Percent by weight (dried) |
|---|---|
| Charcoal | 42.5–80.2 |
| Powdered metal being a member of the group consisting of iron, aluminum, chromium, magnesium, and a mixture of at least two of the foregoing | .5–12 |
| At least one oxidizer being a member of the group consisting of alkali nitrate and alkaline earth nitrate | 15–25 |
| Alkali acetate | 3–6 |
| Binder | .5–6 | and its porosity is brought about by the dissociation, during manufacture of ammonium carbonate or ammonium bicarbonate, incorporated into the original fuel mix as a blowing agent in a proportion of about .8–6% by weight. The combustion catalyst (manganese oxalate, manganese acetate, copper oxalate, or copper acetate) may be present in a catalytic amount up to about 2.5%; however, the composition will also work, though not quite as efficiently, without the catalyst. A preferred range within the foregoing broad range of ingredients is as follows:

| | Percent by weight (dried) |
|---|---|
| Charcoal | 51.7–57.3 |
| Powdered metal being a member of the group consisting of iron, aluminum, chromium, magnesium, and a mixture of at least two of the foregoing | 10.3–11 |
| At least one oxidizer being a member of the group consisting of alkali nitrate and alkaline earth nitrate | 19.1–23 |
| Alkali acetate | 4.2–5.1 |
| Binder | 4–4.2 | and a preferred range for the blowing agent is about 3.8–4.2% by weight.

Having thus explained the general nature of my invention, I now proceed to illustrate, by way of example, a number of specific embodiments of my invention. It will be understood, of course, that these examples are merely illustrative and are not intended to limit the scope of the invention to the specific ingredients or proportions set forth.

*Example 1*

The following ingredients are compounded (percentages by weight):

| | Percent |
|---|---|
| Charcoal | 51.9 |
| Iron powder | 10.3 |
| Ammonium bicarbonate (blowing agent) | 3.8 |
| Sodium nitrate | 23 |
| Sodium acetate | 5.1 |
| Manganese oxalate | 1.9 |
| Starch | 4 |

These constituents are blended in an aqueous or organic solvent to form a viscous paste whose consistency resembles that of tar. This viscous paste is then cast or extruded into fuel sheets or fuel grains as desired, and dried above the dissociation temperature of the blowing agent, say between about 176° F.–230° F.

Aluminum, chromium or magnesium powder may be substituted for the iron powder for some or all of the iron powder. Ammonium carbonate may be substituted for some or all of the ammonium bicarbonate blowing agent. Potassium nitrate, calcium nitrate, magnesium nitrate and/or barium nitrate may replace some or all of the sodium nitrate oxidizer. Potassium acetate may replace some or all of the sodium acetate flux. Flour or pitch may be chosen as the binder instead of starch. Some or all of the manganese oxalate catalyst may be replaced by manganese acetate, copper oxalate or copper acetate. Where a very high degree of cleanliness of the fuel smoke is required (as in cooking of unwrapped food, such as a steak, on an open grill), the catalyst may even be entirely omitted with some reduction in fuel efficiency.

*Example 2*

Example 7 is repeated with the following mixture of ingredients:

| | Catalyzed fuel, percent |
|---|---|
| Charcoal | 51.7 |
| Iron powder | 10.5 |
| Ammonium bicarbonate (blowing agent) | 3.8 |
| Potassium nitrate and sodium nitrate (total) | 23.0 |
| Sodium acetate | 5.1 |
| Manganese oxalate | 1.9 |
| Starch | 4.0 |

*Example 3*

A suitable formula without combustion catalyst is as follows:

| | Uncatalyzed fuel, percent |
|---|---|
| Charcoal | 54.2 |
| Iron powder | 10.7 |
| Ammonium bicarbonate (blowing agent) | 3.9 |
| Potassium nitrate and sodium nitrate (total) | 21.9 |
| Sodium acetate | 5.3 |
| Starch | 4.0 |

A preferred method for producing the fuel compositions of the foregoing examples is as follows:

The oxidizers, alkali acetate salts and catalyst (if used) are dissolved in a mutual solvent, such as water (or an organic solvent), preferably above room temperature. The carbohydrate (or other organic binder) is dissolved in a separate container and cooked until a smooth viscous liquid is obtained. The binder solution is cooled and then combined with the oxidizer and acetate solution previously prepared. This solution is then added to a blended dry powder mixture containing the charcoal, blowing agent and metallic powder. The mixture is blended until it forms a homogeneous paste. This paste is then extruded, or cast in appropriate molds, to obtain the desired fuel configuration (e.g., a slab of ¾ or 1" thickness). The cast or extruded fuel grains are then proofed for about one hour in a well-ventilated oven at about 176° F. and then baked at about 230° F. for approximately 8 hours. The proofing and drying temperatures and times may be adjusted for different blowing agents, so long as the temperature is sufficiently high to permit the blowing agent to dissociate into gaseous compounds and thereby confer the desired porosity on the fuel composition.

My fuel composition can be used to heat water rapidly, to cook fresh foods, to heat canned foods, to broil meats and meat products, to rewarm engines in cold climates for easy starting, as a source of energy in personnel warming devices that may be used by woodsmen and outdoor sportsmen such as fishermen and hunters, and as an emergency fuel for heating, cooking and boiling water in disaster areas.

While I have described, in accordance with the patent statutes, the general nature of my invention and several examples of carrying the same into practice, it will be obvious to those skilled in the art that variations lying within the scope and spirit of my invention may be made. I therefore desire to encompass such variations within the coverage of the appended claims.

I claim:

1. A balanced porous solid fuel composition capable of rapid delivery of intense heat, said fuel composition comprising about:

| | Percent by weight (dried) |
|---|---|
| Charcoal | 42.5–80.2 |
| Powdered metal selected from the group consisting of iron, aluminum, chromium, magnesium, and a mixture of at least two of the foregoing | .5–12 |
| At least one oxidizer selected from the group consisting of alkali nitrate and alkaline earth nitrate | 15–25 |
| Alkali acetate | 3–6 |
| Binder | Remainder | said composition being rendered highly porous by the dissociation at an elevated temperature of at least one blowing agent selected from the group consisting of ammonium carbonate and ammonium bicarbonate, the proportion by weight of said blowing agent prior to dissociation being about .8–6% of said composition; said fuel composition being characterized by a high ratio of surface area to bulk volume and weight prior to combustion, and by a self-regenerating porous combustion surface and by retention of its general shape during its gradual combustion.

2. A fuel composition according to claim 1, which also contains from about .1 to about 2.5% by weight (dried) of at least one combustion catalyst selected from the group consisting of manganese oxalate, manganese acetate, copper oxalate, and copper acetate.

3. A balanced porous solid fuel composition capable of rapid delivery of intense heat, said fuel composition comprising about:

| | Percent by weight (dried) |
|---|---|
| Charcoal | 51.7–57.3 |
| Powdered metal selected from the group consisting of iron, aluminum, chromium, magnesium, and a mixture of at least two of the foregoing | 10.3–11 |
| At least one oxidizer selected from the group consisting of alkali nitrate and alkaline earth nitrate | 19.1–23 |
| Alkali acetate | 4.2–5.1 |
| Binder | Remainder | said composition being rendered highly porous by the dissociation at an elevated temperature of at least one blowing agent selected from the group consisting of ammonium carbonate and ammonium bicarbonate, the proportion by weight of said blowing agent being prior to dissociation about 3.8–4.2% of said composition; said fuel composition being characterized by a high ratio of surface area to bulk volume and weight prior to combustion, and by a self-regenerating porous combustion surface and by retention of its general shape during its gradual combustion.

4. A fuel composition according to claim 3, which also contains from about .1 to about 2.5% by weight (dried) of at least one combustion catalyst selected from the group consisting of manganese oxalate, manganese acetate, copper oxalate and copper acetate.

5. A balanced porous solid fuel composition capable of rapid delivery of intense heat, said fuel composition comprising about:

| | Percent by weight (dried) |
|---|---|
| Charcoal | 51.9 |
| Powdered metal selected from the group consisting of iron, aluminum, chromium, magnesium, and a mixture of at least two of the foregoing | 10.3 |
| At least one oxidizer selected from the group consisting of alkali nitrate and alkaline earth nitrate | 23.0 |
| Alkali acetate | 5.1 |
| At least one combustion catalyst selected from the group consisting of manganese oxalate, manganese acetate, copper oxalate and copper acetate | 1.9 |
| Binder | Remainder | said composition being rendered highly porous by the dissociation at an elevated temperature of at least one blowing agent selected from the group consisting of ammonium carbonate and ammonium bicarbonate, the proportion by weight of said blowing agent prior to dissociation beng about 3.8–4.2% of said composition; said fuel composition being characterized by a high ratio of surface area to bulk volume and weight prior to combustion, and by a self-regenerating porous combustion surface and by retention of its general shape during its gradual combustion.

6. A balanced porous solid fuel composition capable of rapid delivery of intense heat, said fuel composition comprising about:

| | Catalyzed fuel, percent |
|---|---|
| Charcoal | 51.7 |
| Iron powder | 10.5 |
| Alkali nitrate | 23.0 |
| Sodium acetate | 5.1 |
| Manganese oxalate | 1.9 |
| Starch | 4.0 | said composition being rendered highly porous by the dissociation at an elevated temperature of at least one blowing agent selected from the group consisting of ammonium carbonate and ammonium bicarbonate, the proportion by weight of said blowing agent prior to dissociation being about 3.8–4.2% of said composition; said fuel composition being characterized by a high ratio of surface area to bulk volume and weight prior to combustion, and by a self-regenerating porous combustion surface and by retention of its general shape during its gradual combustion.

7. A balanced porous solid fuel composition capable of rapid delivery of intense heat, said fuel composition comprising about:

| | Uncatalyzed fuel, percent |
|---|---|
| Charcoal | 54.2 |
| Iron powder | 10.7 |
| Alkali nitrate | 21.9 |
| Sodium acetate | 5.3 |
| Starch | 4.0 | said composition being rendered highly porous by the dissociation at an elevated temperature of at least one blowing agent selected from the group consisting of ammonium carbonate and ammonium bicarbonate, the proportion by weight of said blowing agent prior to dissociation being about 3.8–4.2% of said composition; said fuel composition being characterized by a high ratio of surface area to bulk volume and weight prior to combustion, and by a self-regenerating porous combustion surface and by retention of its general shape during its gradual combustion.

8. The process of producing a balanced porous solid fuel composition capable of rapid delivery of intense heat, comprising: (A) dissolving in an aqueous solvent an alkali acetate and at least one oxidizer selected from the group consisting of alkali nitrate and alkaline earth nitrate; (B) add the solution thus formed to a solution of a starchy carbohydrate; (C) blending the combined solution with a dry powdered mixture of charcoal, at least one metal selected from the group consisting of iron, aluminum, chromium and magnesium, and at least one blowing agent selected from the group consisting of ammonium carbonate and ammonium bicarbonate to form a pasty mixture; and (D) molding and drying said mixture at an elevated temperature above room temperature which causes said blowing agent to dissociate into gaseous products whereby said composition is rendered highly porous and shape-sustaining during its gradual combustion.

9. The process according to claim 8, wherein said solvent is water.

10. The process according to claim 8, wherein said drying takes place at about 176°–230° F.

11. The process according to claim 8, wherein said first-named solution also contains at least one combustion catalyst selected from the group consisting of manganese oxalate, manganese acetate, copper oxalate and copper acetate.

References Cited in the file of this patent

UNITED STATES PATENTS

| | | |
|---|---|---|
| 790,109 | Conti et al. | May 16, 1905 |
| 847,668 | Lang | Mar. 19, 1907 |
| 889,518 | Giles | June 2, 1908 |
| 1,417,075 | La Cour et al. | May 23, 1922 |
| 1,498,323 | La Cour | June 17, 1924 |
| 1,839,987 | Michels | Jan. 5, 1932 |
| 2,479,561 | Elkan | Aug. 23, 1949 |
| 2,876,084 | Leggin | Mar. 3, 1959 |
| 2,947,110 | Walters et al. | Aug. 2, 1960 |

FOREIGN PATENTS

| | | |
|---|---|---|
| 477,645 | Canada | Oct. 9, 1951 |

UNITED STATES PATENT OFFICE
CERTIFICATE OF CORRECTION

Patent No. 3,133,799                            May 19, 1964

Leo A. Spano

It is hereby certified that error appears in the above numbered patent requiring correction and that the said Letters Patent should read as corrected below.

Column 1, line 53, after "exposed" insert -- surface --; column 3, line 25, for "7" read -- 1 --; column 5, line 30, for "beng" read -- being --.

Signed and sealed this 10th day of November 1964.

(SEAL)
Attest:

ERNEST W. SWIDER                          EDWARD J. BRENNER
Attesting Officer                              Commissioner of Patents